May 2, 1950 W. J. MILLER 2,506,378
APPARATUS FOR MAKING JIGGERED POTTERYWARE
Filed May 22, 1946 5 Sheets-Sheet 1

INVENTOR
William J. Miller.
BY
George J. Croninger
ATTORNEY

May 2, 1950 W. J. MILLER 2,506,378
APPARATUS FOR MAKING JIGGERED POTTERYWARE
Filed May 22, 1946 5 Sheets-Sheet 2

INVENTOR
William J. Miller.
BY
George J. Cominger
ATTORNEY

INVENTOR
William J. Miller
BY
George J. Cunningham
ATTORNEY

Patented May 2, 1950

2,506,378

UNITED STATES PATENT OFFICE 2,506,378

APPARATUS FOR MAKING JIGGERED POTTERY WARE

William J. Miller, Pittsburgh, Pa., assignor to Miller Pottery Engineering Company, Swissvale, Pa., a corporation of Pennsylvania Application May 22, 1946, Serial No. 671,478

14 Claims. (Cl. 25—24)

This invention relates to an apparatus for making jiggered potteryware. It has to do particularly with machinery of a semi-automatic nature for making jiggered dinnerware and the like and a method of making jiggered dinnerware which may be practiced with said machinery.

In conventional practice, when making jiggered ware by hand, it is customary to bat out the clay and then throw the batted out material onto the molding surface of the mold. This operation is performed by a highly skilled craftsman called a "batter out." After the material is applied to the mold, it is jiggered by first placing the mold in a revolving chuck and then bringing an edged profile tool into engagement with the material. This operation is performed by another skilled craftsman called a "jiggerman" who additionally trims off the excess material produced incident to jiggering and lubricates the ware during the jiggering, both operations being manually performed. These two individuals, the batter out and the jiggerman comprise a highly paid manual crew who work together as a team, sometimes with the aid of a mold runner.

It is among the objects of this invention to provide a semi-automatic jigger by means of which the batter out of the manual crew may be displaced and which will perform the operations of fabricating the ware, trimming and lubricating it automatically thereby eliminating the need for skilled craftsmen to jigger the material and thereby contributing to considerable reduction in the cost of manufacturing the product while at the same time, providing for a more uniform production throughout and an increase in the amount of ware produced. Another object is to provide an apparatus for making jiggered dinnerware by means of which the operation of batting out as ordinarily practiced in making ware of this type, may be eliminated and the clay forming process thereby expedited.

Another object of this invention is to eliminate the need for skilled labor in the performance of the jiggering operation thereby further reducing the cost of manufacture. Another object is to reduce tool upkeep, cost and maintenance and to expeditiously produce high grade, uniform ware in economical fashion.

In accordance with the invention hereof, I propose to place a charge of clay on the molding surface of a mold that is smaller in diameter than the ware forming surface of the mold and of symmetrical shape, for example, a circular disc or slice of clay of uniform thickness. I then propose to progressively spread this charge of material over the molding surface of the mold without stretching or tearing the material or producing folds or overlaps therein, by bringing to bear thereon, a plurality of implements formed for spreading out the clay and profiling it, said implements being applied successively, starting with a tool at the center of the piece and followed one after the other by the other tools until the clay is fully spread and profiled. In this manner, the "batting out" operation as heretofore practiced is eliminated and the effect of batting out and jiggering are combined in one operation with consequent saving in time and labor.

With the exception of applying clay to the mold, which is preferably done by hand by the operator but could be performed mechanically as disclosed in my Reissue Patent 20,401, the other operations including that of applying lubricant to the ware and trimming the spare, are all performed automatically with mechanical precision and control. Apparatus constructed in accordance with this invention includes a unitary profile assembly composed of a plurality of sections or divisions each of which is formed to profile a given and different zone of the ware with some overlap if desired. Each tool section is or may be actuated and supplied with lubricant independently of all other tools and is individually adjustable and replaceable. Thus this profile assembly may be employed to practice the novel forming method hereof wherein the jiggering or profiling process is sub-divided and carried out in progressive stepwise fashion, progressing from one zone of the ware to another to reduce the drag on the clay and progressively bond it to the mold, for instance, from the center or inside the foot ring to the perimeter or edge zone, without harmful slipping or creeping of the clay on the mold, distortion or stretching of the clay during the progressive action, or ripping thereof from the mold.

An advantageous feature of this invention resides in the fact that tool sections may be individually replaced without the necessity for removing the entire tool to refile a blunted portion. This saves metal and considerable refiling time and labor since the wear on the working edge of a conventional profile tool is irregular and not all of the surface becomes unserviceable at the same time.

Another advantageous feature of this invention is that the application of lubricant to the surface of the ware may be made individual to each tool section and controlled so as to supply only the exact requirements thereof which may vary from that required for other tools or ware zones.

Another advantageous feature is that each zone of the ware from the center brimwise may receive individual treatment in the spreading and profiling of the clay. Thus such factors as the pressure required to spread and profile the clay, the time of application and withdrawal of the tool, the duration of the profiling action etc. may all be individually regulated and controlled and varied when need be.

The method, and the apparatus shown herein for practicing the method, are for making mold bonded, jiggered ware in earthenware, semi-vitreous and vitreous grades. This type of ware is made from plastic mixtures of ceramic materials sometimes referred to herein by the more common term "clay." The clay is formed into ware in or on plaster molds of conventional type and form.

While we have shown herein certain apparatus of a semi-automatic nature for fabricating the ware, it will be understood that the method may be practiced by hand.

The apparatus comprises, a frame having a base plate 1 upon which some of the operating mechanism to be later described is mounted. Above the base is a shelf 2 upon which other operating mechanism and the mold chucking unit 3 is supported. This shelf is carried by angles 4 bolted to pairs of corner posts 5 and 6 respectively which support the top or table 7. The rear post extensions 8 extend upwardly above the table and are connected by a cross beam 9 near the top.

Figure 16:
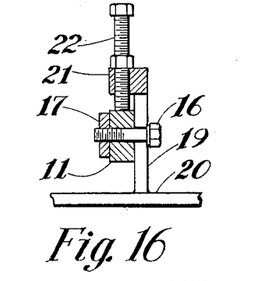
Figure 16 is a detail view, partly in section of the die supporting means.

Mounted at the rear center of the table 7 is a pedestal 10 upon which a tool carrying lever 11 is pivotally mounted on shaft 12. Said lever has a rear extension upon which an adjustable counterweight 13 is slidably received. The tool 14 is adjustably mounted on the opposite end of the lever. This is accomplished by providing a pair of spaced, aligned slots 15 in the lever through which bolts 16 are screwed into clamping plates 17, Figure 16, behind bifurcated attaching members 19 fixed to the tool head 20. When these bolts are loosened, the tool may be moved longitudinally of the lever to proper operating position. The tool may also be vertically adjusted on the lever. For this purpose, each member 19 has an offset boss 21 screw threaded to receive adjusting screws 22, Figure 16.

An adjustable lever stop is provided in the form of a screw 23 carried by the lever 11 and a screw 24 to be engaged thereby mounted on a stationary extension 25 of pedestal 10.

Figures 1, 2:
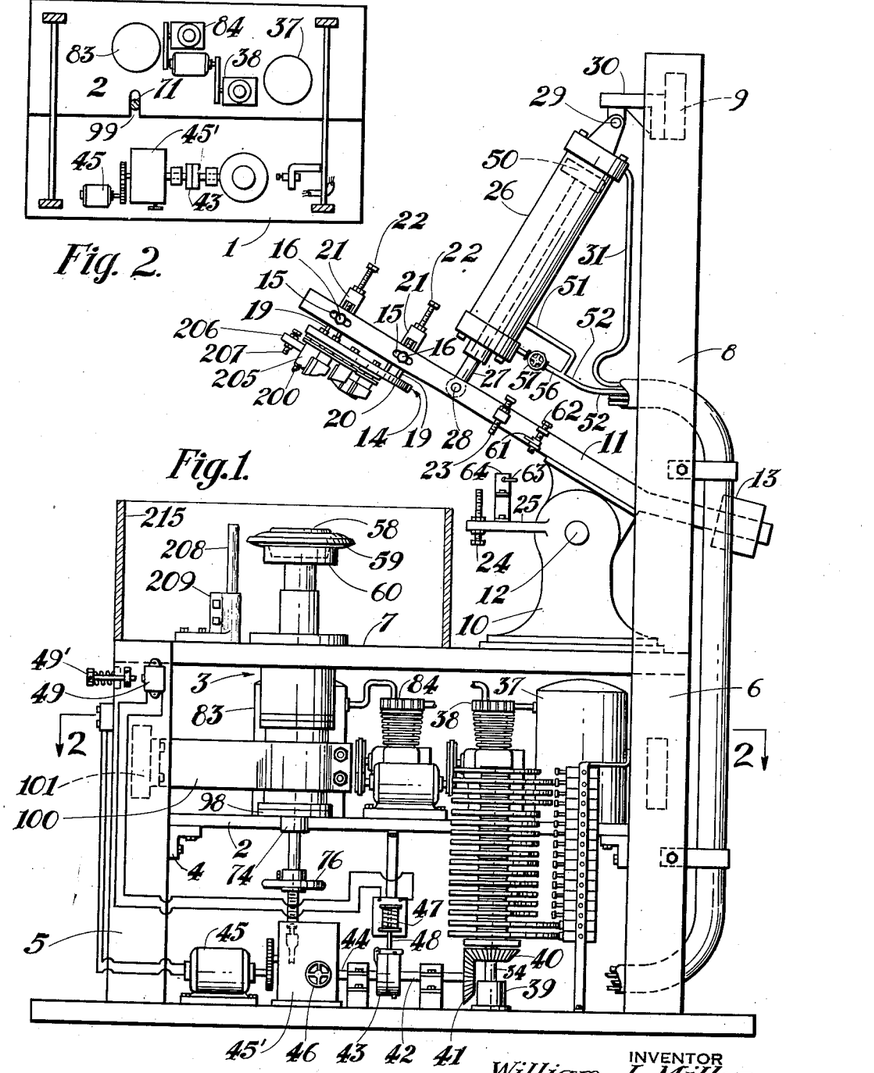
Figure 1 is a side elevation of a jiggering machine embodying my invention.
Figure 2 is a diagrammatic plan view on a smaller scale, of the base section of the machine.
Figure 4:
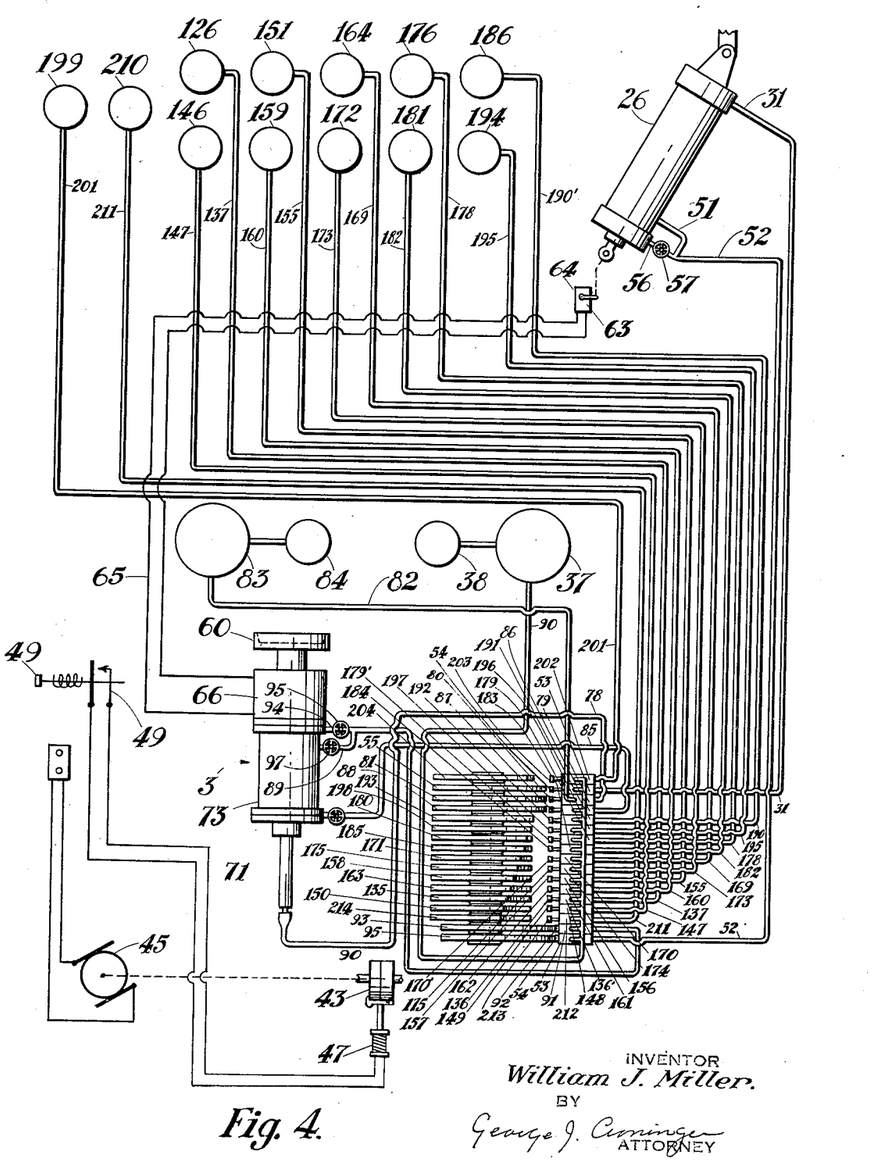
Figure 4 is a piping and wiring diagram combined showing fluid lines and electrical circuits of the machine of Figure 1.

Lever 11 is automatically operated by air cylinder 26 whose piston rod 27 is pivotally connected at 28 to the lever between the fulcrum and the tool end. The other end of the cylinder is pivotally connected at 29 to a bracket 30 attached to cross beam 9. To operate the air cylinder, a flexible hose 31, Figures 1 and 4, is connected to the upper end of the cylinder and to a valve 32 operated by a cam 33 on cam shaft 34. Said valve has a valve operating plunger 35 which when released by the cam, will connect hose 31 with an air line 36 leading from a pressure tank 37 charged by a motor driven compressor 38. The compressor and pressure tank are mounted on shelf 2, Figures 1 and 2, whereas the cam shaft 34 is supported by a bearing 39 mounted on the base plate 1.

Said cam shaft 34 is driven by a pinion 40 fixed thereon which engages a pinion 41 on clutch shaft 42. 43 is a single revolution clutch whose drive shaft 44 is driven by motor 45 through a variable speed transmission 45' having a manual control wheel 46 for regulating the speed. The starting of the single revolution clutch is controlled by an electro-magnet 47 to which the clutch release rod 48 is attached. Said magnet is connected in circuit with a push button switch 49 mounted on the side of one of the corner posts in a position conveniently accessible to the operator. Thus, when the operator depresses the starter button 49', which he instantly releases, cam shaft 34 is then revolved which causes cam 33 to effect the lowering of lever 11 and the tool supported thereby to working position.

As the piston 50 of air cylinder 26 is moved downwardly, the air there ahead of is exhausted through air line 51 and flexible hose 52 and discharged to atmosphere through the vent side of valve 53, Figure 4, whose valve operating plunger 54 has been depressed by cam 55 on cam shaft 34 to thereby move the plunger to a line venting position and to disconnect hose 52 from air line 36. In order to provide for a slow approach of the tool to its working position, the connection between line 51 and the interior of the air cylinder casing is spaced upwardly from the bottom of the cylinder and, as the piston completes its stroke, it closes line 51 and the air is then exhausted through a lower secondary line 56 having a flow control valve 57 therein which can be manually regulated to provide the desired speed of approach.

Figure 5:
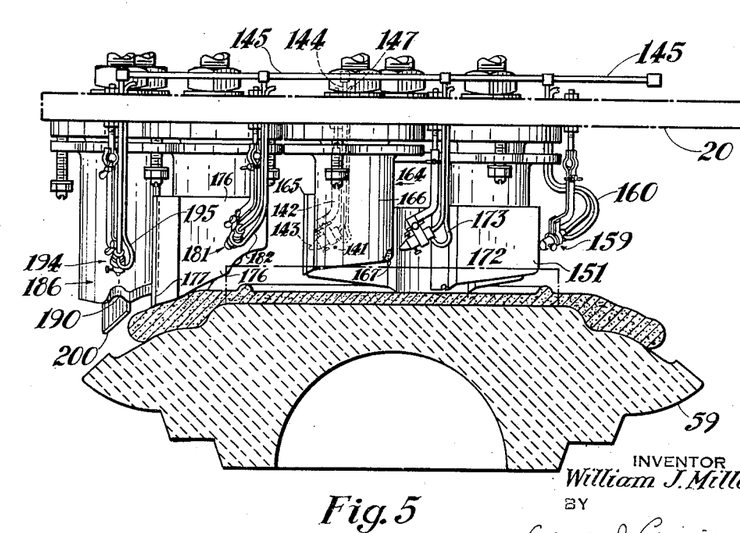
Figure 5 is an elevation of the preferred form of profile assembly shown in association with a mold illustrated in vertical section.
Figure 11:
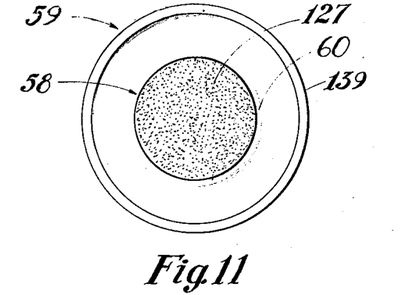
Figure 11 is a plan view showing a flat ware jigger mold with a charge of clay thereon.

The manual operator may either place the charge of clay 58, Figures 5 and 11, on the mold 59 and then put it in the chuck 60, Figure 1 or else place the charge in position after the mold is seated in the chuck. The charge is preferably of disc like proportions, see Figure 11, and is placed on the center of the molding surface which in the case of the average dinnerware mold, would be the central elevated plateau 60'. The charge contains a sufficient volume of clay from which to prepare the piece of ware and the charge may be formed mechanically by a conventional automatic or semi-automatic slice or cut off by hand at the jigger bench from a cylindrical pug of clay.

After the mold is placed in the chuck, the operator depresses the starting button 49' as aforesaid and, as the lever 11 approaches the working position, an adjustable trip 61, Figure 1, on screw 62 carried by the lever, engages and depresses the switch lever 63 of switch 64 mounted on bracket 25. This switch is connected by circuit 65, Figure 4, with an electric motor 66, Figure 3, formed as a part of the chuck supporting and rotating assembly 3, to thereby start the chuck and mold to rotating.

Figure 3:
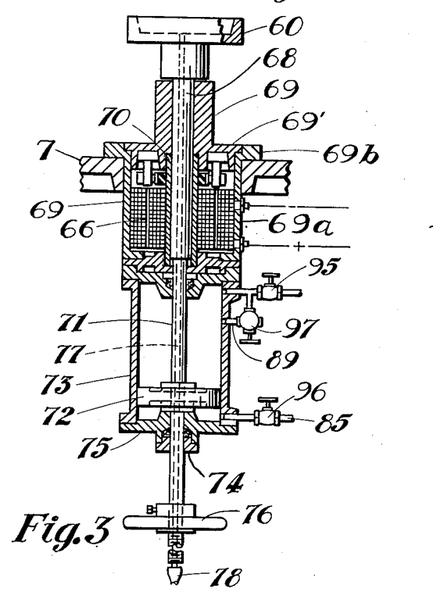
Figure 3 is a sectional elevation through one of the mold supporting units.

Said chuck supporting and rotating assembly comprises a spindle 68, Figure 3, upon which the chuck is fixed that is journaled in an elongated bearing 69 whose flange 69' is seated in a groove in the end of motor housing 69a partly supported by flange 69b from table 7. Sometimes, it is desirable to reciprocate the mold chuck and I have shown herein a chuck supporting and operating unit which will permit this action where necessary or required. The spindle 68 is in key sliding engagement with a sleeve 70 which is secured to the motor armature. On the reduced lower end 71 of the spindle, a piston 72 is mounted and this piston is enclosed in a cylinder casing 73 fastened to the motor housing. The spindle projects through a gland 74 in the cylinder cap 75 and has a stroke regulating wheel 76 screwed on the lower end for adjusting the altitude of reciprocation of the chuck.

In order to vacuumize the chuck and thereby grip the mold thereto, said spindle has a vacuum passage 77 bored axially therethrough and connected at the lower end to a vacuum hose 78 connected to a valve 79, Figure 4, having a valve operating plunger 80 to be depressed by cam 81 on cam shaft 34 to connect hose 78 with vacuum line 82 leading to a vacuum tank 83 in which minus pressure is maintained by a motor driven vacuum pump 84. The pump and tank are mounted on shelf 2, Figure 1. Vacuum is connected to the chuck just prior to the commencement of rotation thereof and is disconnected by closing valve 79 and venting line 78 to atmosphere after the fabricating operations have been completed, preferably after the lever 11 has been elevated and the rotation of the chuck stopped.

For elevating the chuck, an air pipe 85, Figure 4 is connected to the lower end of casing 73 and to a valve 86 whose plunger 87 is to be depressed by cam 88 to connect pipe 85 with pressure line 36. Air ahead of the piston 72 is forced out of the casing through pipe 89 into pipe 90 and vented through valve 91 whose plunger 92 is depressed by cam 93 simultaneously with the release of plunger 87 thereby to disconnect pipe 90 from pressure line 36. In order to provide for a slow rise during the final stages of chuck elevation, the inlet to pipe 89 is spaced below the top of cylinder casing 73 and when piston 72 closes the inlet to said pipe, the air there ahead of is discharged through pipe 94 and manually adjustable reducing valve 95 into pipe 90. Pipe 85 is provided with a shut-off valve 96 and pipe 89 is provided with a shut-off valve 97. If the chuck is not to be elevated during fabricating operations, valves 95, 96, and 97 are closed.

The lower end of casing 73 is flanged as at 98 and this flange partly supports the chucking unit on shelf 2 with the gland 74 received in a slot 99, Figure 2, cut inwardly from the edge of the shelf so as to permit easy removal of the gland therefrom. The chucking unit is additionally supported by a clamp 100, Figure 1 fastened around the cylinder casing 73 and bolted to a cross beam 101 connecting the front cover posts 5.

The fabricating tool hereof includes a plurality of individual clay spreading and profiling implements that are identical in construction except for differences in shape and contour of the working surfaces which are formed for accomplishing the three-fold purpose of profiling the clay, smoothing it and spreading the same toward the brim of the mold.

The clay working characteristics of the individual implements will be separately discussed hereinafter as well as the location and disposition thereof relative to the surface of the mold and the manner in which they are operated. Since they are generally the same in structure, I will first describe construction and the means for operating them, reference being had to Figures 7 to 10 inclusive.

Each implement has a lower, movable backing block portion 105 provided with a contoured clay engaging surface 106. A profile 107 is fastened to one side surface of this block by screws 108 in the same position it would normally occupy in the case of a conventional profile tool assembly. The backing block is formed with a hollow sleeve 109 having radial ears 110 provided with slightly oversize, oppositely disposed bolt holes 111. This sleeve is fitted over the hollow tubular end 112 of a support 114 which has a reduced threaded end 115 projecting upwardly through an oversize hole 116 in tool head 20 and secured in position by nut 117. Support 114 has a radial flange 118 into which the hanger screws 119 which suspend the backing block 105 are screwed. The shanks of these screws are smooth throughout the midsection so that the backing block may move up and down on them within the limits permitted by the radial flange 118 and nuts 120, the latter being adjustable to increase or decrease the stroke which may be additionally lengthened by backing off screws 119.

The backing block is adapted to move downwardly by air under pressure which is introduced into the hollow interior 121 through a passage 122 in the reduced end 115 of support 114 to which a hose connection is attached to be connected to a source of air under pressure as will be hereinafter described. To return the profile and backing block to raised position on the support 114, a spring 122 is provided which is connected by a screw 123 at the bottom of the hole to the backing block and has a hooked end 124 hooked over the top of the reduced end 115. The backing block and support may be easily dissembled by unhooking the spring at the top and removing nuts 120.

Figure 7:
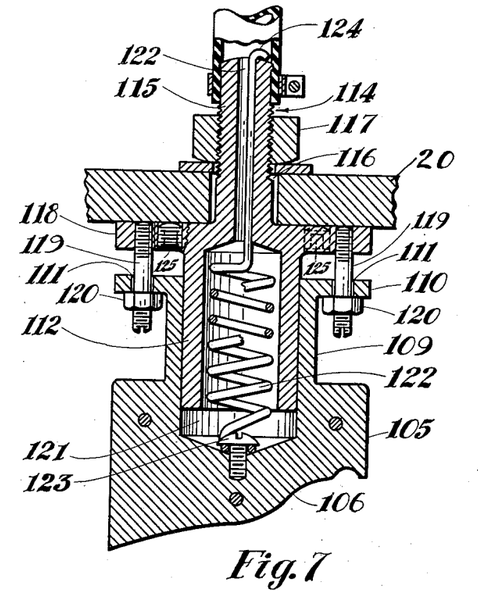
Figure 7 is a sectional elevation through one of the tool sections of the profile assembly of Figures 5 and 6.
Figure 8:
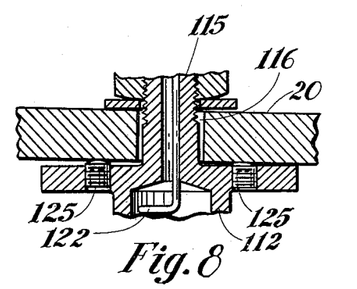
Figure 8 is a detail in vertical section showing how the angular position of the tool section may be adjusted.
Figure 9:
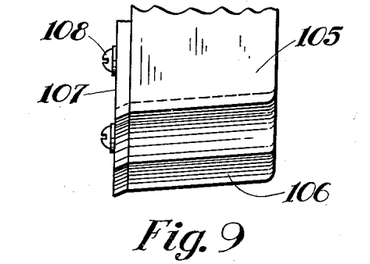
Figure 9 is a detail in bottom perspective showing the underneath portion of one of the tool sections.
Figure 10:
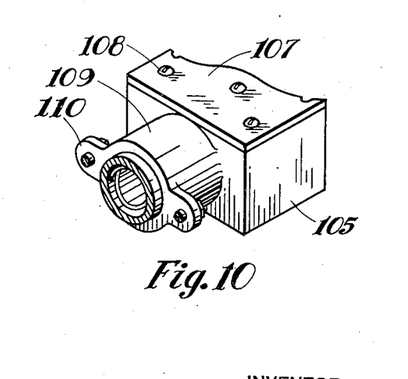
Figure 10 is a view of one of the tool sections.

In order to adjust the angular position of the implement and backing block relative to the work, I have provided two pairs of oppositely disposed set screws 125, see Figures 7 and 8, in flange 118 which bear on the underside of the tool head 20 and can be adjusted so as to hold the implement at an angle to the vertical as illustrated in Figure 8.

Figure 6:
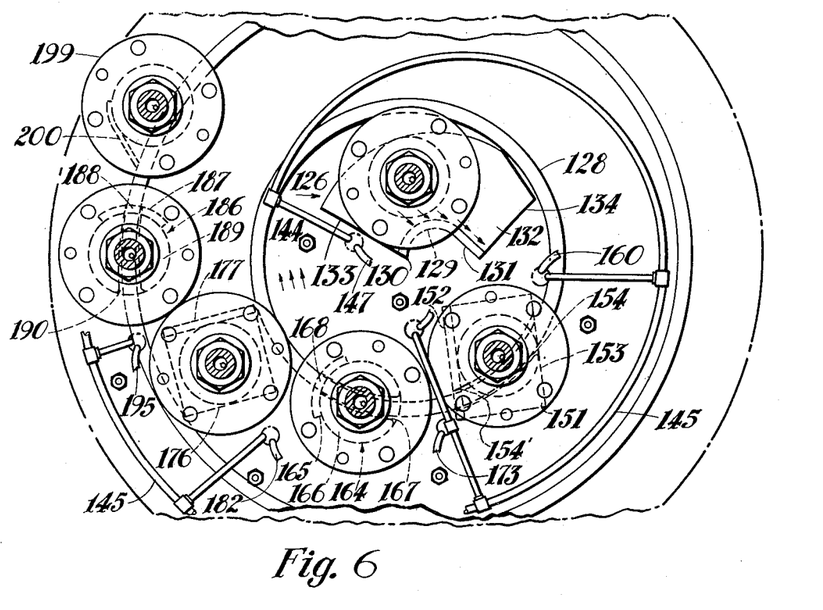
Figure 6 is a plan view, partly broken away of the profile assembly and mold of Figure 5.

With reference to Figure 6, the implement numbered 126 is formed and positioned so as to act upon the central area 127, Figure 11, of the ware or that area within the foot ring 128. This implement is formed with a profile 129 that is curved rearwardly from the tip 130 to the right for several degrees and then has a straight edge portion 131 lying along a chord of the circle of the foot ring 128. The backing block 132 is curved around the implement and the leading face 133 and the trailing edge 134 form extensions of the end faces of the profile. The clay engaging surface of this implement may be tapered inwardly toward the profile. The implement is positioned with the tip 130 of the profile slightly beyond the center of rotation of the mold which rotates in a clockwise direction (see arrows).

Figure 12:
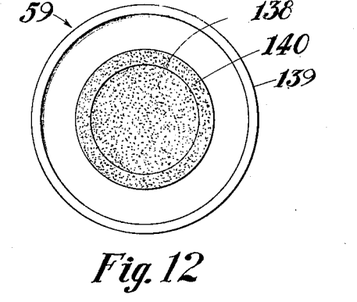
Figure 12 illustrates the first step in the fabricating method wherein the central zone of the charge is profiled.

Implement 126 is the first one of the group to act upon the clay charge. After the lever 11 is lowered and the mold commences to rotate, cam 135 on cam shaft 34, Figure 4, depresses plunger 136 of valve 136' to thereby connect air hose 137 with pressure line 36 and this causes the profile 129 and backing block 132 to move downwardly into the center of the clay charge 58, Figure 11, and form a hollow depression 138, Figure 12, in the center thereof. The clay is caused to flow toward the brim 139 of the mold and to form a thick ring 140 of surplus material, Figure 12, extending beyond or over the limits of the high center plateau 69 of the mold. The implement is preferably moved gradually into the clay so as not to tear the clay loose from the mold to which it is adhesively bonded, due to the inherent stickiness of the clay.

Water may be applied to the clay for lubrication purposes coincident with the engagement of the profile therewith or before or after initial engagement and may be applied during the profiling operation continuously or in a succession of jets. For this purpose, a water spray 141, Figure 5, is provided that is supported from the tool head 20 by an adjustable bracket 142 by means of which the angle and position of the nozzle 143 may be manually changed so as to direct the lubrication to the desired point on the surface of the ware being profiled. This water spray is connected by a water pipe 144 to a main water line 145 common to all of the water sprays associated with the other implements. Said water spray has an air actuated valve which turns on the water coincident with the discharge of air through the nozzle thereby to atomize the water. This valve is shown diagrammatically at 146 in Figure 4 as being connected to an air hose 147 leading to a valve 148 having a plunger 149 to be actuated by cam 150 to connect hose 147 to pressure line 34. The time, duration and frequency of water application for any of the implements may be varied to suit and will depend, of course, upon the development of the cam.

After the center of the ware has been profiled and reduced to proper thickness or prior to the time the operation is completed, the next implement 151, Figure 6, may be caused to operate. This implement is positioned so as to act upon the central zone of the ware and to direct clay being delivered thereto by implement 126 brimwise into and beyond the foot ring 128 zone, see Figure 13. The profile 152 of this implement is straight and the backing block 153 is rectangular in shape. The clay engaging surface of the block is broad and tapered toward the tool and is provided with an oversize clay husbanding groove 154 contiguous with foot ring forming groove 154', in profile 152, Figure 7, however in this case, the grooves are oversize and act to rough out the foot ring. The profile is set at an angle to the straight edge portion 131 of profile 129, Figure 6, so as to receive and direct the clay over onto the verge zone 140' of the mold, see Figure 14, whilst forming the foot ring 128, Figure 13.

To operate implement 151, a hose line 155 is connected to valve 156 whose plunger 157 is depressed by cam 158 to connect hose line 155 to pressure line 36. To operate the water spray 159 associated with implement 151, said spray (shown diagrammatically in Figure 4) is connected by hose line 160 to valve 161 whose plunger 162 is to be depressed by cam 163 to connect hose line 160 to pressure line 36.

The next implement to be applied to the work is 164 which may be considered as the foot ring finishing implement. This implement has a curved profile 165 straddling the foot ring zone of the ware and overlapping the zone profiled by implement 156. Due to the curve of the profile, the clay is directed into the foot ring zone and beyond into the verge zone and generally in brimwise direction as desired. The backing block 166 in this instance is circular in shape and has a clay engaging surface tapering toward the profile and provided with a tapered clay husbanding groove 167 contiguous with the foot forming groove 168 in the tool.

To operate this implement, hose 169 is attached thereto connected to a valve 170 whose plunger 170' is adapted to be depressed by cam 171 to connect hose 169 with high pressure line 36. To operate the water spray 172 associated therewith, air hose 173, Figure 4, is connected to valve 174 having a plunger 175 to be depressed by cam 175' thereby to connect hose 173 with pressure line 36.

Figure 13:
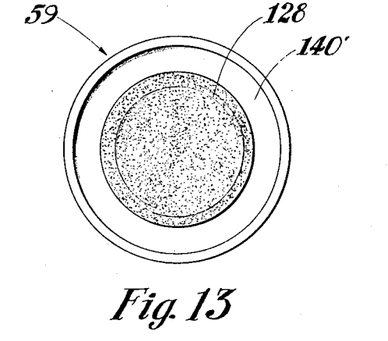
Figure 13 illustrates the next step in the fabrication of the ware wherein the foot ring is formed.
Figure 14:
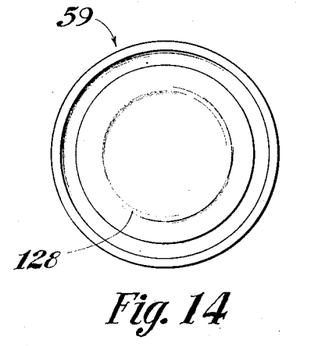
Figure 14 illustrates another step in the process of fabricating the ware wherein the verge zone of the piece is formed.

The next implement in sequence to be operated is 176, Figure 6, which is arranged to profile the back of the ware overlying the verge zone 140', Figures 13 and 14, and whose profile tool 177 is set at an angle such that the clay will be directed towards the brim of the mold. This tool is substantially the same as implement 151 except that it does not have any groove in the clay engaging surface thereof. To operate this tool, which may be caused to engage the ware prior to the completion of the foot ring 128 forming operation, air hose 178 associated therewith is connected to valve 179 whose plunger 179' is to be depressed by cam 180 to connect air line 36 therewith and thus cause the profile to move into engagement with the clay. To apply water to the ware, the water spray 181, Figure 5, associated therewith has an air hose 182, Figure 4, connected to a valve 183 whose plunger 184 is to be depressed by cam 185 to connect air line 36 therewith.

Figure 15:
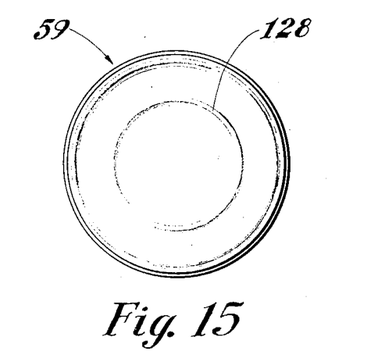
Figure 15 is a plan view illustrating the final stages of fabrication wherein the rim of the ware is formed.

The last implement in sequence to be operated is 186 which is substantially the same as implement 164 and is provided with a profile 187 having a rim forming groove 188 and a backing block 189 having a husbanding groove 190 contiguous with groove 188. This profile is curved so as to direct the surplus clay into the brim zone 139 of the mold and the span of the implement is such as to overlap the end of profile tool 177. To operate this implement which may be caused to engage the ware prior to completion of the verge forming operation, an air hose 190', Figure 4, is connected to valve 191 whose plunger 192 is to be depressed by cam 193 to connect air line 36 therewith. To operate the associated water spray 194, an air hose 195 is connected to valve 196 whose plunger 197 is to be depressed by cam 198 to connect air line 36 therewith. At this stage of operations, the ware will have become fully extended and the back profiled somewhat as shown in Figure 15 and except for trimming the excess clay from the brim of the mold, the piece is finished insofar as clay state forming is concerned.

To trim the scrap clay from the brim zone of the mold, a trimming implement 199, Figure 6, is provided which is similar in construction to the profiling implement except that it has no profile tool and instead is equipped with a trimmer wire 200 or blade if desired. This trimmer is not operated until the surplus clay has been pushed off onto the brim of the mold by implement 186. To operate the trimmer, an air hose 201 is connected to valve 202, Figure 4, whose plunger 203 is to be depressed by cam 204 to connect air line 36 therewith. Inasmuch as the trimmer may cut or scratch the mold if applied too hard thereto, I have provided for stopping the trimmer at a predetermined level. Thus the movable casing 205 of the trimmer has a projecting bracket 206 in which an adjustable stop screw 207, Figure 1, is threaded. This screw is adapted to engage a post 208 adjustably supported in a holder 209 bolted to the top 7 of the frame.

It is sometimes desirable to spray the brim of the mold with water, particularly where the ware is being subsequently dried by infra-red heat. Therefore, if desired, an extra water spray 210, Figure 4, may be placed alongside the trimmer for this purpose, or if it is desired to blow the trimmings off the mold, the water line may be disconnected and the spray used for this purpose. To operate this spray, an air hose 211, Figure 4, is connected to a valve 212 whose plunger 213 is to be depressed by a cam 214 to connect air line 36 therewith.

As to the time of withdrawal of these several implements with the work and the retraction of the trimmer, I prefer to do this in the inverse order of their application to the work. Furthermore, if desired, the tools may be progressively applied to the work from the center outwardly until all are in action and then all may be simultaneously withdrawn prior to or after the lifting of lever 11. Various operating patterns and sequences may be developed, however, generally it is through the progressive application of the implements to the ware, that the area of clay bonded to the mold is always greater than the area being acted upon by the tools individually or collectively.

To catch the scrap produced during jiggering, the table 7 is provided with an enclosure 215 surrounding the mold.

I claim:

1. Apparatus for making jiggered potteryware comprising, a frame, a mold support carried thereby, a tool support mounted thereon, a tool carried by said support, said tool including a plurality of relatively movable implements formed for spreading and jiggering clay on the surface of pottery jigger molds, and means for moving said implements relative to one another and to the work to cause them to act progressively and individually and severally to spread clay over the ware forming surface of a mold and jigger the material.

2. Apparatus for making jiggered potteryware comprising, a frame, a mold support carried thereby, a tool support mounted thereon, a tool carried by said support, said tool including a plurality of relatively movable implements formed for spreading and jiggering clay on the surface of pottery jigger molds, and means for moving said implements relative to one another in successive order to cause them to act progressively and individually to spread clay progressively over the ware forming surface of a mold from the center outwardly and jigger the material incident to spreading it.

3. Apparatus for making jiggered potteryware comprising, a frame, a mold support carried thereby, a tool carried by said support, means for relatively rotating the mold support and tool, said tool including a plurality of relatively movable implements formed for spreading and jiggering clay on the surface of pottery jigger molds, and means for moving said implements relative to one another to cause them to act progressively and individually upon the clay and spread the same progressively from the central region of a mold to the brim zone and jigger the material incident to spreading.

4. Apparatus for making jiggered potteryware comprising, a frame, a mold support carried thereby, a tool support mounted thereon, a tool carried by said support, said tool including a plurality of relatively movable implements formed for spreading and jiggering clay on the surface of pottery jigger molds, and power driven means operable through a cycle to effect movement of said implements relative to one another to cause them to act individually to spread clay progressively over the ware forming surface of a mold and jigger the material incident to spreading it.

5. Apparatus for making jiggered potteryware comprising, a frame, a mold support carried thereby, a tool support mounted thereon, a tool carried by said support, said tool including a plurality of relatively movable implements formed for spreading and jiggering clay on the surface of pottery jigger molds, fluid operated means for moving said implements relative to one another, and means for controlling the operation of said fluid actuated means whereby said implements are caused to act individually and in successive order to spread clay progressively over the ware forming surface of a mold and jigger it.

6. Apparatus for making jiggered potteryware comprising, a frame, a mold support carried thereby, a tool support mounted thereon, a tool carried by said support, said tool including a plurality of relatively movable, fluid operated implements formed for spreading and jiggering clay on the surface of pottery jigger molds, fluid operated means for moving said implements, power driven means for controlling the operation of said fluid operated means, manually operated means for starting the operation of said power driven means, and means for automatically stopping said power driven means.

7. Apparatus for making jiggered potteryware comprising, a frame, a rotatable mold support carried thereby, means for rotating said support, a movable tool support mounted on said frame, fluid operated means for moving said tool support, a tool carried by said support, said tool including a plurality of relatively movable, fluid operated implements formed for spreading and jiggering clay on the surface of pottery jigger molds, and power means operable through a cycle to effect operation of said fluid operated means.

8. Apparatus for making jiggered potteryware comprising, a frame, a mold support carried thereby, power means for rotating said mold support having a control, a tool support movable mounted upon said frame operable to actuate said control, fluid operated means for moving said tool support, a tool carried by said support, said tool including a plurality of relatively movable implements formed each spreading and jiggering clay on the surface of pottery jigger molds, fluid operated means for actuating said implements, and power means operable through a cycle for causing said fluid operated means to move said implements in successive order to operate clay progressively over the ware forming surface of the mold and jigger it.

9. Apparatus for making jiggered potteryware comprising, a frame, a rotatable mold support carried thereby, a tool support movable mounted upon said frame, fluid operated means for moving said tool support, a tool carried by said support, said tool including a plurality of relatively movable implements formed for spreading and jiggering clay, fluid operated means for actuating said implements, a plurality of spray heads for lubricating the surface of the clay being acted upon, fluid operated means for actuating said spray heads, trimming means, fluid operated means for actuating said trimming means, and power means operable through a cycle to effect the successive operation of said implements to spread clay progressively over the ware forming surface of a mold and to effect the operation of said spray heads and trimmer at predetermined intervals.

10. A tool for use in making jiggered potteryware comprising, a tool head, a plurality of implements formed for jiggering and spreading clay, and means for mounting said implements on said tool head including fluid operated devices by means of which each implement may be reciprocated relative to the work.

11. A tool for use in making jiggered potteryware comprising, a tool head, a plurality of implements formed for jiggering and spreading clay, and adjustable means for mounting said implements on said tool head including fluid operated devices by means of which each implement may be reciprocated relative to the work.

12. A tool for use in making jiggered potteryware comprising, a tool head, a plurality of implements formed for jiggering and spreading clay, means for mounting said implements on said tool head having means for adjusting the position of each implement relative to the work, fluid operated devices by means of which each implement may be reciprocated relative to the work, and individually controllable means associated with each implement for applying fluid to the work.

13. A tool for use in making jiggered potteryware comprising, a tool head, a plurality of implements formed for jiggering and spreading clay, means for mounting said implements on said tool head having means for adjusting the position of each implement relative to the work, fluid operated devices by means of which each implement may be reciprocated relative to the work, individually controllable means associated with each implement for applying fluid to the work, and a fluid operated trimmer adjustably mounted on said tool head.

14. Apparatus for making jiggered potteryware comprising, a frame, a mold support carried thereby, a tool support mounted thereon, a tool carried by said support, said tool including a plurality of individually operable implements formed for spreading and profiling clay on the surface of pottery jigger molds, mechanical means for moving one support relative to the other to bring the tool into working position, means for rotating one support relative to the other for jiggering purposes, and mechanical means operable to move said tools in predetermined sequence when in working position to progressively form the ware from the central zone outwardly to the rim zone.

WILLIAM J. MILLER.

REFERENCES CITED

The following references are of record in the file of this patent:

UNITED STATES PATENTS

| Number | Name | Date |
|---|---|---|
| 1,472,022 | Cockbill et al. | Oct. 23, 1923 |
| 1,757,132 | Miller | May 6, 1930 |
| 1,762,387 | Dengler | June 10, 1930 |
| 1,826,577 | Schantz | Oct. 6, 1931 |
| 2,293,070 | Miller et al. | Aug. 18, 1942 |
| 2,334,640 | Miller | Nov. 16, 1943 |

FOREIGN PATENTS

| Number | Country | Date |
|---|---|---|
| 10,384 | Great Britain | June 6, 1900 |